US006289360B1

(12) United States Patent
Kolodner et al.

(10) Patent No.: US 6,289,360 B1
(45) Date of Patent: Sep. 11, 2001

(54) METHOD AND SYSTEM FOR ELIMINATING SYNCHRONIZATION BETWEEN SWEEP AND ALLOCATE IN A CONCURRENT GARBAGE COLLECTOR

(75) Inventors: Elliot K. Kolodner; Ethan Lewis, both of Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/167,546

(22) Filed: Oct. 7, 1998

(51) Int. Cl.[7] .................................................. G06F 12/00
(52) U.S. Cl. ............................................ 707/206; 707/200
(58) Field of Search ........................................ 707/1–206

(56) References Cited

U.S. PATENT DOCUMENTS

| 5,761,670 | * | 6/1998 | Joy ........................................ 707/206 |
| 5,819,299 | * | 10/1998 | Bejar .................................... 707/206 |
| 5,848,423 | * | 12/1998 | Ebrahim et al. ..................... 707/206 |
| 5,930,807 | * | 6/1999 | Ebrahim et al. ..................... 707/206 |
| 5,991,779 | * | 4/2000 | Bejar .................................... 707/206 |
| 6,052,699 | * | 4/2000 | Huelsbergen et al. ............... 707/206 |

OTHER PUBLICATIONS

Dijkstra et al., "On–the–Fly Garbage Collection: An Exercise in Cooperation", *Communications of the ACM*, 21:966–975, (1978).

Hudak et al., "Garbage Collection and Task Deletion in Distributed Applicative Processing Systems", *ACM Symposium on Lisp and Functional Programming*, 168–178, (1982).

Doligez et al., "A concurrent, generational garbage collector for a multithreaded implementation of ML", *Proc. 20th Symp. Principles of Programming Language*, 113–123, (1993).

Doligez et al., "Portable, Unobtrusive Garbage Collection for Multiprocessor System", *Conference Records of Twenty–first Annual ACM Symposium on Principles of Programming Languages*, 1994.

Lamport et al., "Garbage Collection with Multiple Processes: An Exercise in Parallelism", *IEEE Transctions on Computers*, 50–54, (1978).

* cited by examiner

Primary Examiner—Thomas Black
Assistant Examiner—John G. Mills
(74) Attorney, Agent, or Firm—Browdy and Neimark

(57) ABSTRACT

A computer-implemented method for eliminating synchronization between sweep and allocate in respect of a newly created object in a concurrent garbage collector for a heap implemented in shared memory having mark and sweep phases. In a first collection cycle, a first attribute is associated with objects believed to be reachable and a second attribute is associated with objects believed to be unreachable, whilst for each successive collection cycle, the roles of the first and second attributes are exchanged. In accordance with conventional mark-sweep garbage collectors, the attribute is a color: usually Black and White for objects which are believed to be reachable and unreachable, respectively. Exchanging the colors for each collection cycle eliminates the overhead in synchronizing the color marking of a new object depending on whether it is located in an area of the heap that has already been swept or has yet to be swept.

21 Claims, 5 Drawing Sheets

METHOD AND SYSTEM FOR ELIMINATING SYNCHRONIZATION BETWEEN SWEEP AND ALLOCATE IN A CONCURRENT GARBAGE COLLECTOR

FIELD OF THE INVENTION

This invention relates to garbage collection for computer memory management and, in particular, to a concurrent garbage collection algorithm.

REFERENCES

Many of the prior art techniques mentioned in the next section are discussed in greater detail in the following publications:

[1] Edsgar W. Dijkstra, Leslie Lamport, A. J. Scholten, E. F. Scholten, E. F. Steffens, On-the-fly Garbage Collection: An Exercise in Cooperation, *Communications of the ACM*, November, 1978.

[2] Paul Hudak, Robert M. Keller, Garbage Collection and Task Deletion in Distributed Systems, *ACM Symposium on Lisp and Functional Programming*, pp. 168–178, Pittsburgh, Pa, August 1982.

[3] Damien Doligez, Xavier Leroy, A concurrent generational garbage collector for a multithreaded implementation of ML, *Proc. 20th Symp. Principles of Programming Languages*, 1993, pp. 113–123.

[4] Damien Doligez, Georges Gonthier, Portable Unobtrusive Garbage Collection for Multi-Processor Systems, *Conference Record of the Twenty-first Annual ACM Symposium on Principles of Programming Languages*, January, 1994.

[5] Leslie Lamport, Garbage Collection with Multiple Processes: An Exercise in Parallelism, 1978.

[6] Leslie Lamport, How to Make a Multiprocessor Computer that Correctly Executes Multiprocess Programs, *IEEE Transactions on Computers*, C-28(9): 690–691, September 1979.

BACKGROUND OF THE INVENTION

Within the context of computer memory management, garbage collection relates to the automatic reclamation of computer storage. When data objects such as arrays, records and other data structures are created, space for the object is allocated in the heap. The term "object" is used herein to denote generally any piece of memory. When the object is no longer needed, its space must be freed in order that the heap does not become saturated with objects that are no longer required for the computation. Computer programming languages such as Pascal or C, typically require the programmer to attend to reclamation of heap storage manually. The programmer must keep track of information that allows him to determine when an object can be safely discarded. This manual heap maintenance is feasible, although prone to errors.

The continuing need to avoid such errors has rendered systems and languages supporting garbage collected heaps very attractive. Developing software in such environments is much faster because garbage collection eliminates a large class of programmer errors, both in the design and implementation stages. Furthermore, in programming languages such as Java from Sun Microsystems, which is emerging as a standard Internet tool and a platform-independent implementation vehicle, there is no explicit de-allocation by the programmer and therefore use of these languages mandates a good garbage collection algorithm.

The garbage collector's task is to locate data objects that are not longer required, and to reclaim their space in memory for use by the running program. In mark-sweep garbage collectors, garbage collection is implemented in two successive stages. In a first stage, the object graph described by the interrelation of objects starting from the roots and traversing all connected objects in the heap, is traced so as to identify live objects. An object is considered live if it is reachable either directly from the roots or from some other live object. Any other object is considered garbage and can be collected. The roots include global state (e.g. global variables) and the local state of each thread (e.g. the thread's stack and its local variables on that stack). The live objects are marked in some way so as to distinguish between live objects and garbage. In a second stage, the memory is swept, all the memory space occupied by unmarked objects (garbage) is reclaimed and the marked objects are unmarked, in preparation for the next garbage collection cycle.

In so-called "concurrent" garbage collectors, the execution of the program which updates and changes the object graph is concurrent with the marking and sweeping operations carried out by the collector. Whilst this avoids processor inactivity during garbage collection, the running program may change the object graph during the very act of tracing out reachable data objects by the collector. For this reason, the running program is referred to as the mutator since it mutates or changes the object graph. As a result, there exists the risk that the collector may miss marking a live object and the live object may then be subsequently reclaimed by the collector. In order to avoid this possibility, synchronization between the mutator and collector threads is essential.

An important consideration with regard to concurrent collectors is their degree of conservatism with respect to changes made by the mutator during garbage collection. Thus, an object may have been marked as live by the garbage collector and subsequently made unreachable by the mutator. Such an object constitutes floating garbage which is not reclaimed during the current garbage collection cycle. It will, however, be collected during the next cycle since it will be identified as garbage at the beginning of the next collection.

Floating garbage clogs up the heap unnecessarily and thus is undesirable. Whilst a certain amount of floating garbage may be tolerated and, indeed, is inevitable since no garbage collector can be completely efficient, the reverse can under no circumstances be tolerated. That is to say, reachable objects must never be marked as unreachable by the tracer since their space would then be erroneously collected, causing possibly catastrophic effects on the application program. This asymmetry inclines garbage collectors towards being naturally conservative since it always better not to reclaim garbage than to reclaim it erroneously. This conservatism impacts on the manner in which conflicts between mutator allocation and garbage collector sweep are resolved.

The question arises as to how to mark an object newly allocated by the mutator, especially during the sweep phase of garbage collection, which collects unmarked objects and resets the mark of marked objects. During the sweep phase, an object which is allocated in those locations of the heap that have not yet been swept in the current sweep cycle, must be allocated as marked, so that the sweep will not collect them. Objects which are allocated in an area which has already been swept must be allocated as unmarked in order that they be unmarked for the start of the next collection. This requires synchronization, be it implicit or explicit, between the sweep process and the allocation procedure, lest an object be subsequently reclaimed whilst still alive.

A sub-class of concurrent garbage collectors are so-called "on the fly" garbage collectors first introduced by Dijkstra et al. [1]. In this type of garbage collector, the manner in which reachable objects are marked is by assigning a different color attribute to distinguish between reachable and unreachable objects. This approach has been adopted in both concurrent and "on the fly" garbage collectors, a four-color marking conventionally being used. A "white" color indicates that an object is unmarked. A "gray" color indicates that an object is marked, but that its direct descendants may not yet be marked (i.e. some may be white). A "black" color indicates that an object is marked and that all its direct descendants are marked (either gray or black). Finally, a "blue" color indicates that the object is free. Use of a fourth color to distinguish free objects avoids the need for the garbage collector to trace these objects, and thus saves time. In such a scheme, "gray" or "black" objects are also referred to as "shaded" objects. At the start of the cycle all objects are white. During tracing, the color of live objects progresses from white to gray to black. After tracing, the collector then sweeps: white objects are colored blue and appended to the free list; shaded objects are changed to white in preparation for the next collection cycle.

The advantage of "on the fly" garbage collectors resides in that there is no synchronization point where the mutator threads have to stop. This obviates the need for explicit locking which might otherwise lock out the mutator and collector threads in order to force synchronization between them. However, as will be seen, this does not itself preclude implicit synchronization whereby the order of operations as performed by a thread in a multiprocessor system is significant and must be the same order perceived by other threads. That is to say, given the absence of explicit synchronization between collector and mutator threads, what is referred to as "strong" or "sequential" consistency may be required for correctness of the collection algorithm. As defined by Lamport[6] a multiprocessor system is sequentially consistent if the result of any execution is the same as if all of the processors were executed in some sequential order, and the operations of each individual processor appear in this sequence in the order specified by the program. An analogous definition for sequential consistency of a multi-threaded or multi-process execution holds.

There are two requirements for sequential consistency. First, program order must be maintained among operations from a single processor thread, and secondly a single sequential order must be maintained among all operations. For reasons of performance, modern multiprocessors do not guarantee sequential consistency; rather they provide a more relaxed form of consistency. In the absence of sequential consistency in a multiprocessor system, special steps must be taken in order to ensure that when a new object is allocated during the sweep stage of the collector, it will be marked the appropriate color. This will now be explained in greater detail with particular regard to the Doligez and Gonthier collector[4].

When a mutator allocates a new object, i.e. removes it from the free list and starts using it, it must assign the proper color to the new object. The proper color depends on the stage of the collection cycle currently being executed by the collector thread. While no garbage collection is taking place and at the start of the collection cycle the proper color is white. At some point during the mark/trace phase, the proper color becomes black (the point depends on the specific collection algorithm). During sweep, the proper color is black if the object is in an area of the heap that has not yet been swept and white if the object has already been swept. Choosing the proper color during sweep requires synchronization between the mutator thread allocating the object and the collector thread. This synchronization may be implicit and depend on the ordering of read and write operations as in the collector described by Doligez and Gonthier[4].

The Doligez and Gonthier collector is a descendent of the Dijkstra collector and is described in pseudocode. Mutator threads perform actions including the coloring of newly created objects in cooperation with the collector. Exactly what actions they need to perform are determined by where the collector thread is in the collection cycle. To facilitate this cooperation, each mutator thread has a status field connected with it which takes one of three values: Sync1, Sync2, Async. The collector calls for mutators to change their status three times per collection cycle. The mutators change status in a circular fashion, progressing from Async to Sync1 to Sync2 and back to Async. When the collector reaches a certain point in its cycle, it requests that all the mutators take on the succeeding state. These requests are known as handshake actions. For example Handshake (Async) signifies that the collector is requesting all mutators to change their state from Sync2 to Async.

The Doligez and Gonthier collector calls for the mutators to execute a create protocol every time an object, x, is allocated by a mutator, m. The purpose of the protocol is to choose a color for the newly created object. It is assumed that a mutator does not respond to a handshake action, i.e., change its collection status during the execution of the create protocol:

color[x]=Black;
    if (status[m]≠Async or x <swept)
       color[x]=White;
    else if (x==swept)
       color [x]=Gray;

Checking the conditions in the create protocol involves accessing a global variable, swept, which must be reloaded from memory on each access. The value of swept represents the collector's progress in sweeping the heap. While the collector is not sweeping, the global variable swept is set to some value guaranteed to be larger than the value of any address in the heap. Just before Mark/Trace, the collector resets this value to less than the lowest address in the heap. During sweeping this value is gradually incremented as the collector processes the elements in the heap. Its value represents the address of the object currently being swept.

Execution of the create protocol is important: if a newly created object is colored White at the wrong time it will be incorrectly collected. If it is colored Black, this implies that its immediate descendants have been marked. Therefore, coloring Black at the wrong time, i.e. before the immediate descendants are marked may result in the descendants being incorrectly collected. It is always safe to color Gray, but inefficient: if an object is Gray neither it nor its descendants can be collected. This contradicts the prime goal of the collector, namely to free unused memory.

Sweeping in the Doligez and Gonthier collector is done by the following pseudocode:

swept=0;
    while (swept<end_of_heap) do
       if (color[swept]==Black or color[swept]==Gray)
          color[swept]=White;
       else if (color[swept]==White)
          color[swept]=Blue;

append_to_free_list(swept);
swept=swept+1;
swept=+infinity;

Synchronization between object allocation and sweep is implicit and complex to understand. It also depends on the allocating mutator thread reading an up-to-date value of the variable swept. On multiprocessor architectures that do not guarantee sequential consistency (e.g. the PowerPC), sweep may require a synchronizing instruction (e.g. sync on PowerPC) after incrementing the variable swept, and object allocation may require a synchronizing instruction before reading the value of the variable swept. These synchronizing instructions are multi-cycle instructions and may require memory access; thus they are quite expensive.

Hudak and Keller[2] describe a collector for an esoteric distributed applicative processing system (DAPS) model. In this model there is no shared memory between processors. Thus, consider a standard stack-implementation of the mark phase of a conventional collector in shared memory. Each root is marked and pushed on to the stack. Nodes are then repetitively removed from the stack in order to examine each of their descendants in the object graph. If a descendant is already marked, no further action is required; otherwise, it is also marked and pushed on to the stack. Thus, the stack serves as a place-holder for nodes that have been marked but whose descendants have not yet been examined.

Implementing a stack for DAPS would impose a very high synchronization overhead. In place of the stack, Hudak and Keller employ a marking tree of tasks. The marking tree reflects the parallel nature of distributed marking in a manner analogous to the linear stack reflecting the nature of sequential marking. Thus, whilst a sequential mutator adds nodes to a stack, so their distributed collector starts a new task and adds it as a branch in the marking tree.

In order to avoid the synchronization between object allocation and sweep, Hudak and Keller further propose switching the meaning of the black and white colors on successive collection cycles. In saying this, it is to be noted that Hudak and Keller themselves acknowledge that the term "color" has a different interpretation for their distributed system than for conventional shared data structures. In particular, their definition of "color" is related to their marking tree data structure.

The sweep phase in the garbage collector disclosed by Hudak and Keller comprises three separate phases. At the end of marking, white nodes are garbage, and all tasks pointing to white nodes are irrelevant. The sweep phase first terminates irrelevant tasks, then collects all white nodes by adding them to the free-list, and then prepares the system for the next collector cycle. In practice, adding white nodes to the free list requires that they first be "bleached" since nodes on the free-list have no color in the Hudak and Keller collector. Trace is finished when there are no gray nodes left and therefore at end of trace all nodes which are reachable are black. There can also be white and bleached nodes. This, incidentally, is distinct from the Doligez and Gonthier collector mentioned above, where there can be gray nodes. Doligez and Gonthier do not invest the effort to prevent this condition since their collector works correctly on the assumption that all reachable nodes are shaded and point to other nodes which are shaded.

Thus, at the start of the sweep in the Hudak Keller collector, there can be no gray nodes. The question which remains, therefore, is what to do with the black nodes. It is inadmissible merely to paint them white in preparation for the next mark phase, since if this were done at the same time as the sweeping process is reclaiming white nodes, live nodes would be freed with fatal consequences. Therefore, Hudak and Keller simply ignore black nodes until the sweep is complete, whereafter the mutator is instructed to reverse its sense of black and white. That is, when the sweep phase is complete, the mutator sees only black nodes. If now, it interprets them as being white, then the mark phase is ready to begin.

The implementation of this approach by Hudak and Keller is intimately bound up with the parallel processing afforded by the distributed nature of their mutators since, in effect, there exist many processing elements each acting independently. When one processing element changes its sense of color, it views all nodes in the system as being white, even though some other processing element may view the same nodes as being black. As long as they are all either white or black, the mutators behave the same. It is only after all processing elements have "reversed colors" that the next mark phase is allowed to commence.

It is further to be noted that Hudak and Keller do require locking when updating a node by a program thread in order to prevent other processors from updating the same node. In this connection, particular reference should be paid to their two complementary tasks add-ref and expand-node. Add-ref selectively adds an arc to the marking tree and is used to spawn a new node in the object graph during tracing. Expand-node allows a program thread to add a new sub-graph to a selected node. In both cases, a child, or descendant node, may be selected only when the mutator threads are locked against accessing the memory address of the parent node. Moreover, the color which is assigned by expand-node to a child node, depends on the node's hierarchy in the object graph. Thus, the color of the parent node must first be checked. If it is Black then the child node is also set to Black whilst otherwise it is set to White.

The need always to check the color of the parent before assigning a color to a newly allocated object coupled with the need for explicit locking constitute a major overhead which degrades the performance of the garbage collector.

It is thus apparent that the color reversal proposed the Hudak and Keller collector is very specific to their DAPS model and is by no means immediately applicable to other garbage collectors. This is borne out by the fact that Hudak and Keller published their marking-tree collector in 1982 and since that time no attempt has been made to try to apply their techniques to other concurrent garbage collectors.

Finally, mention is made of Lamport[5] who also describes a mechanism for changing the meaning of colors for a concurrent and on-the-fly collector. He proposes his mechanism in order to pipeline the collection algorithm, so that the trace of new collection cycle can work in parallel with the sweep of the previous collection cycle. His algorithm does not have the race between allocate and sweep because he bases his algorithm on Dijkstra's original 3 color scheme.

SUMMARY OF THE INVENTION

It is a principal objective of the invention to eliminate synchronization between sweep and allocate in respect of a newly created object in a concurrent garbage collector for a heap implemented in shared memory having mark and sweep phases.

A further objective of the invention is to avoid the need in such a garbage collector to calculate which color must be assigned by a mutator to a newly allocated object every time a new object is allocated, thereby speeding up the color determination and subsequent garbage collection.

These objectives are realized in accordance with a first aspect of the invention by a method for eliminating synchronization between sweep and allocate in respect of a newly created object in a concurrent garbage collector for a heap implemented in shared memory having mark and sweep phases, the method comprising the steps of:

(a) in a first collection cycle, associating a first attribute with objects believed to be reachable and associating a second attribute with objects believed to be unreachable, (b) in a successive collection cycle, associating said first attribute with objects believed to be unreachable and associating said second attribute with objects believed to be reachable, and (a) repeating steps (a) and (b) for all successive cycles.

BRIEF DESCRIPTION OF THE DRAWINGS

In order to understand the invention and to see how it may be carried out in practice, a preferred embodiment will now be described, by way of non-limiting example only, with regard to the known garbage collector described by Doligez and Gonthier[4] and with reference to the accompanying drawings, in which.

DETAILED DESCRIPTION OF PREFERRED EMBODIMENTS

Hardware Environment

Figure 1:
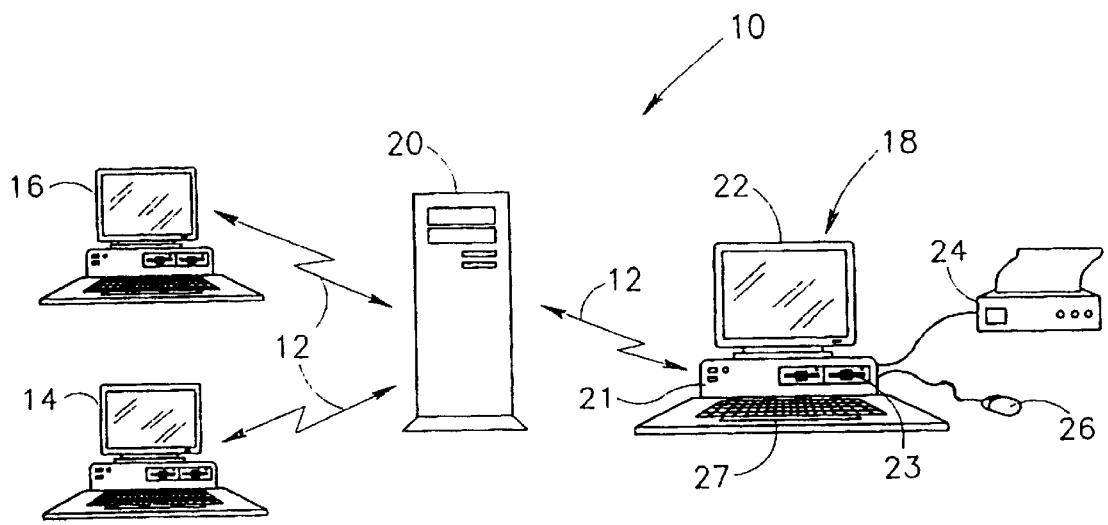
FIG. 1 is a block diagram showing functionally a computer system for implementing the invention.

FIG. 1 shows a computer system depicted generally as 10 being part of a network 12 including one or more client computer systems 14, 16 and 18 (e.g. desktop or personal computers, workstations, etc.) coupled to a server system 20. The network 12 may represent practically any type of networked interconnection, including but not limited to local-area, wide-area, wireless and public networks e.g. the Internet. Moreover, any number of computers and other devices may be networked through the network 12, e.g. multiple servers. Alternatively, the principles of the invention may be equally well be implemented by standalone computers and associated devices consistent with the invention.

The computer system 18, which may be similar to the computer systems 14, 16 and 20 may include one or more processors such as a microprocessor 21. There may further be included a number of peripheral devices such as a display monitor 22; storage devices 23 such as hard, floppy and/or CD-ROM disk drives; a printer 24; and various input devices such as a mouse 26 and a keyboard 27. The computer system 18 operates under the control of an operating system and executes various computer software applications, programs, objects, modules, etc. Moreover, various applications, programs, objects, modules, etc. may also execute on one or more processors in the server system 20 or other computer systems 14 and 16, e.g. in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more of the processors in the devices or systems in the computer system 10, cause those devices or systems to perform the steps necessary to execute steps or elements embodying the various aspects of the invention.

Software Environment

Figure 2:
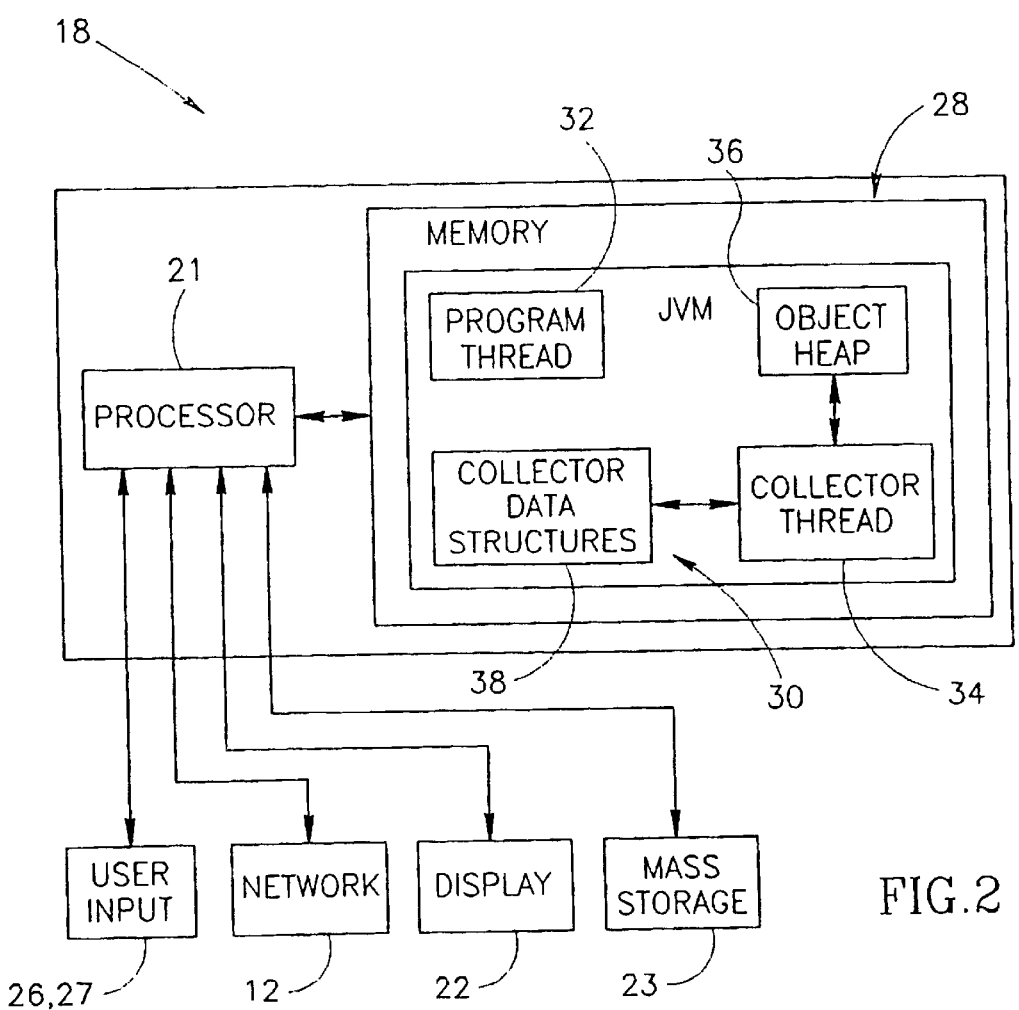
FIG. 2 is a block diagram of an exemplary software environment for the computer system of FIG. 1, illustrating a collector thread according to the invention.

FIG. 2 illustrates one suitable software environment for the computer system 18 consistent with the invention. The processor 21 is coupled to a memory 28 as well as to several inputs and outputs. A Java Virtual Machine (JVM) execution module 30 is illustrated as resident in the memory 28 and is configured to execute program code on the processor 21. Specifically, the JVM executes one or more program threads 32, as well as a collector thread 34 that is used to deallocate (or "free up") unused data stored in an object heap 36. The collector thread 34, which is described in greater detail below with reference to FIGS. 3 to 11 of the drawings, also uses a plurality of data structures 38 referred to generally as objects. The execution module 30 may be resident as a component of the operating system or of the computer system 18. Alternatively, it may be implemented as a separate application that executes on top of an operating system. Furthermore, any of the execution module 30, program thread 32, collector thread 34, object heap 36 and collector data structures 38 may, at different times, be resident in whole or in part in any of the memory 28, mass storage 23, network 12, or within registers and/or caches in the processor 21.

It should also be noted that the various software components may also be resident on, and may execute on, other computers coupled to the computer system 10. Specifically, one particularly useful implementation of an execution module consistent with the invention is executed in a server such as an AS/400 midrange computer system from International Business Machines Corporation.

Overview

FIGS. 3 to 11 show flow diagrams depicting the principal steps in a garbage collector according to the invention based on the model described by Doligez and Gonthier[4]. Specifically, there will be described the modifications which must be made thereto, there being no need to describe in detail those aspects of the garbage collection algorithm which are fully detailed in the Doligez and Gonthier reference.

Before actually describing the specific changes that are proposed to the Doligez and Gonthier algorithm, the basic principles will first be detailed. To implement the idea of exchanging colors, there are introduced two global variables, whiteColor and blackColor, which play the roles that were formerly played by White and Black. Rather than changing the color of reachable objects during sweeping, the values of these variables are exchanged. That is, the color that indicated an object is marked during one collection cycle indicates that it is unmarked the next collection cycle.

Along with this, objects are colored upon creation according to the value of a variable. The value of the variable changes once per collection cycle, from whiteColor to blackColor. There are two possible implementations for this. One is for each program thread to use its own thread local variable. This implementation is isomorphic to the Doligez and Gonthier algorithm with regard to coloring during tracing. The other variation is to use a global variable.

There will now be described the required changes to the psuedocode of the Doligez and Gonthier collector. To implement the new coloring scheme means for the most part adjusting the psuedocode wherever White or Black appeared. Usually those constants are replaced by whiteColor and blackColor, respectively. There are some exceptions to this such as in sweep and create. There are a few insertions to the code to maintain the new variables. The affected pseudocode is detailed together with some explanatory comments. The functions given below in pseudocode and shown schematically in the Figures are exactly the same as those given by Doligez and Gonthier in [4] except for some inserted or changed lines which are marked in the Figures with an asterisk.

Global Variables color[x] is the color of the object at address x on the heap. There are four colors: Color1, Color2, Gray, and Blue.

There are three global variables which take the value of Color1 or Color2:

whiteColor and blackColor, which take over the rôles formerly played by White and Black.

allocationColor, which is used for initialization of the thread local allocColor[m].

Initially whiteColor and blackColor are opposed and allocationColor=blackColor.

Thread Local Variables

There is also defined an additional variable local to each mutator thread, m, allocColor[m], the color which that mutator assigns an object upon creation.

As in Doligez and Gonthier, the collector thread has associated therewith a status variable, status[c], which takes one of three values: Sync1, Sync2, Async. Each mutator thread has a status field, status[m], associated with it which can take on the same three values. The collector changes its status three times per collection cycle in a circular fashion, progressing from Async to Sync1 to Sync2 and back to Async. When the collector changes its status, this serves as a signal to the mutator threads also to take on the succeeding status.

Operation

Figure 3:
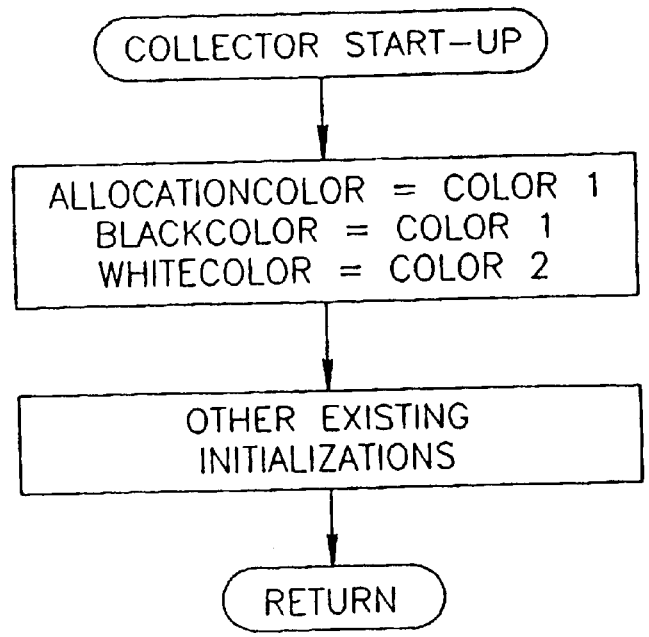
FIGS. 3 to 11 are flow charts showing the principal operating steps associated with the collector thread of FIG. 2.
Figure 4:
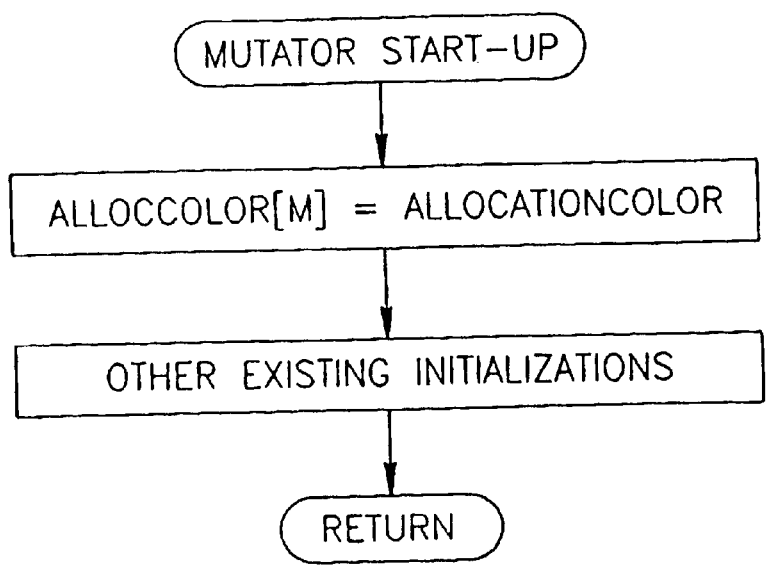

FIG. 3 shows the initialization of the collector thread wherein the values of whiteColor and blackColor and allocationColor are initialized. FIG. 4 shows the initialization of a mutator or program thread, wherein the allocation color variable, local to that thread, allocColor[m], is assigned its initial value. In both FIGS. 3 and 4, there may be required other initializations in accordance with the Doligez and Gonthier algorithm and these remain unchanged.

Figure 5:
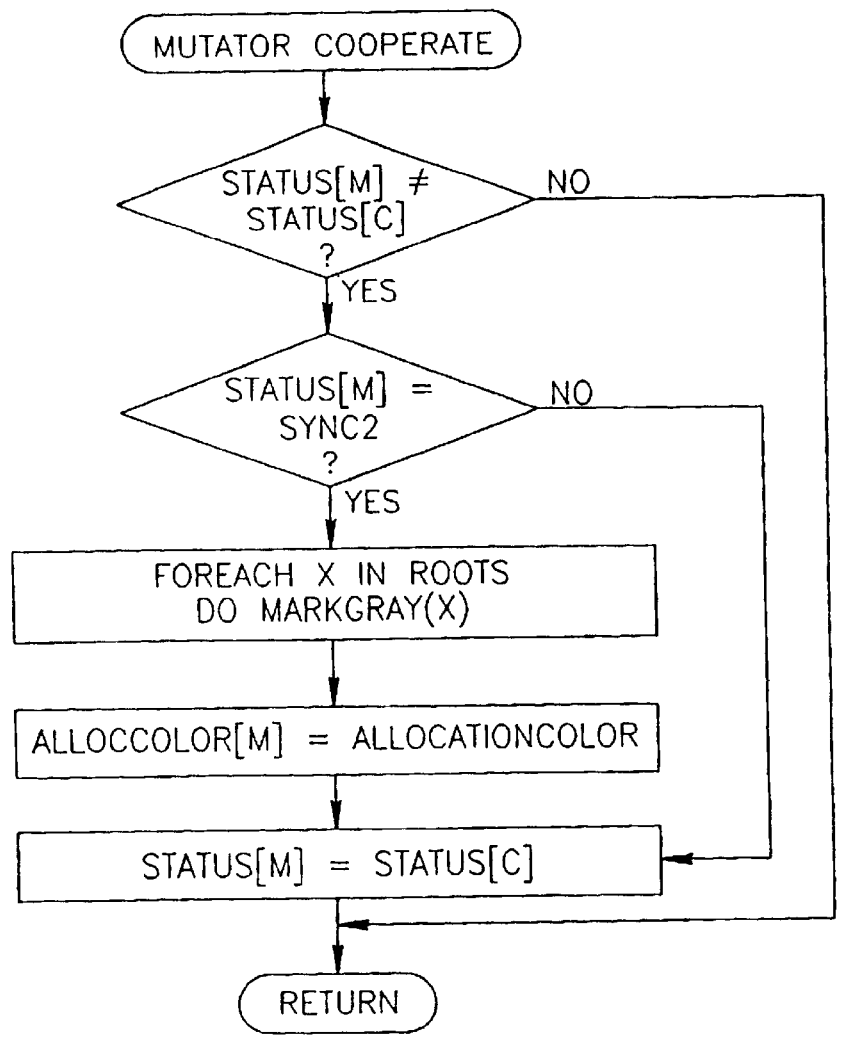

FIG. 5 shows the cooperate procedure which is executed at regular intervals by the mutator threads as in Doligez and Gonthier. Cooperate checks if the mutator thread's local status[m] is equal to the status[c] variable of the collector. If so, cooperate terminates. Otherwise, if status[m] is currently equal to Sync2, then cooperate calls MarkGray in order to shade each of the thread's local roots. Thereafter, the thread's allocColor[m] variable is set equal to the global allocation color variable, allocationColor. The mutator thread's local status[m] is then set to the status[c] variable of the collector. If status[m] were not equal to Sync2, then status[m] is set to status[c] of the collector. It is to be noted that the cooperate procedure is identical to that of Doligez and Gonthier, except for the addition of the assignment of the allocColor[m] variable. The pseudocode for the cooperate procedure is as follows:

```
cooperate() {
  if (status[m]≠status[c])
    if (status[m]==Sync2)
      foreach x in{local roots of m}do
        MarkGray (x); *
      alloccolor[m]=allocationColor;
    status[m]=status[c];
```

Figure 9:
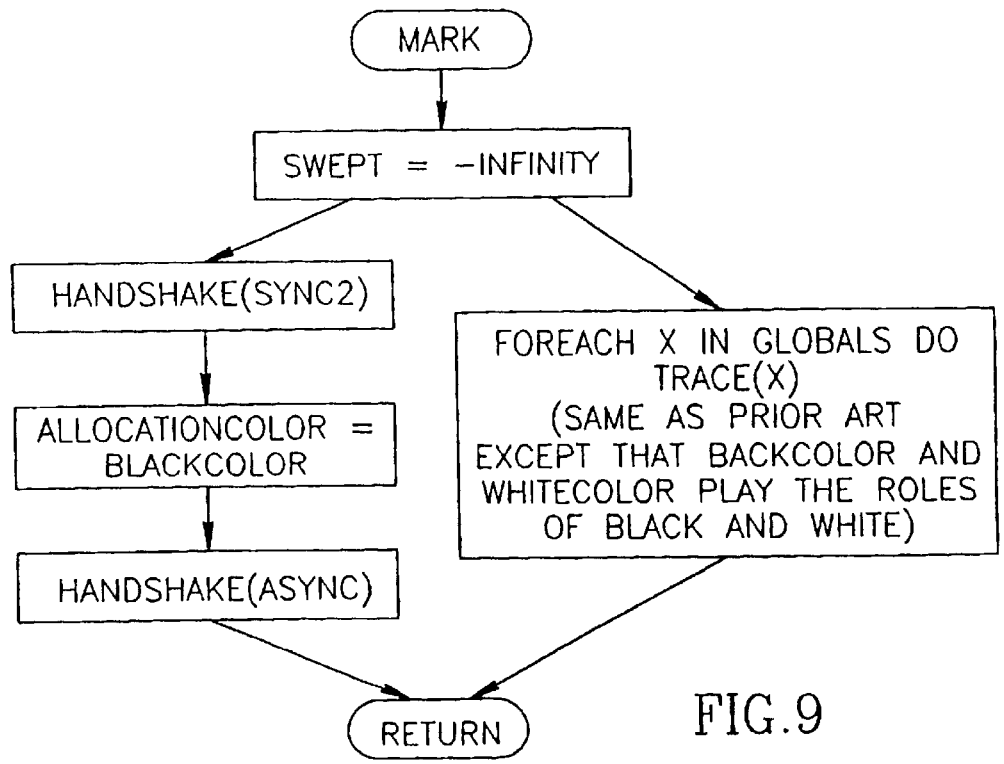

It will be noted from the following description of the Mark stage shown in FIG. 9, that allocationColor is changed to blackColor immediately prior to the collector thread initiating the handshake to bring the mutator threads to Async. Thus, in the cooperate procedure, during the transition from Sync2 to Async, allocationColor is equal to blackColor. It thus follows that the alloccolor[m] variable is changed to blackColor immediately after the thread marks its local roots. By waiting until this point, floating garbage is avoided.

Figure 6:
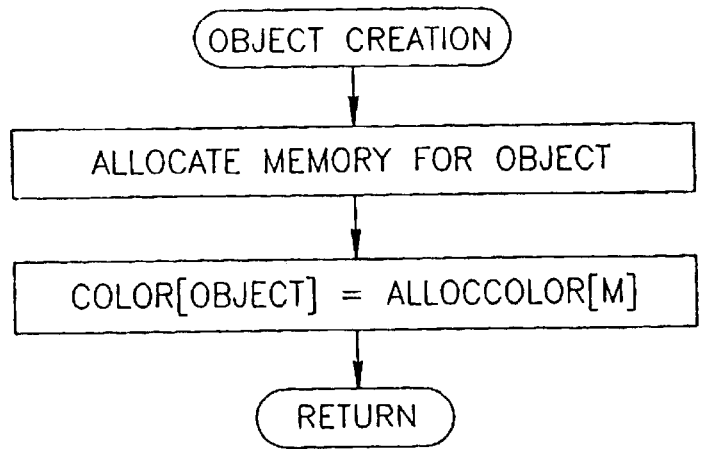

FIG. 6 shows the create protocol. First, memory is allocated for the new object. The color of the new object is then assigned the value of allocColor[m]. Thus, the pseudocode reduces to:

pick x∈pool
color[x]=alloccolor[m]

It is thus seen that no calculation is required to determine the color to assign to a newly allocated object, and that no synchronization with the sweep stage is required.

Figure 7:
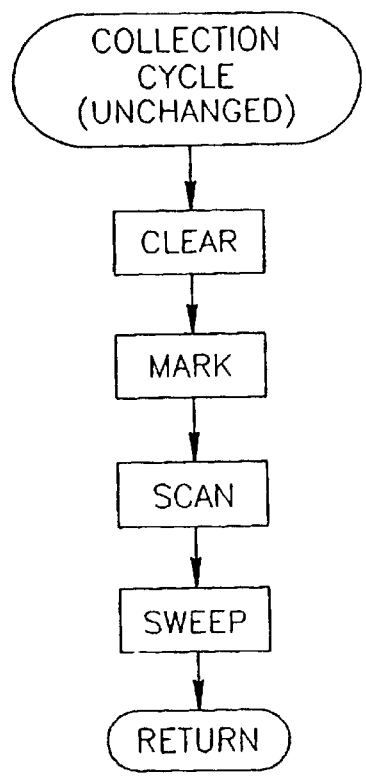

FIG. 7 shows the collection cycle which consists of four stages: Clear, Mark, Scan and Sweep, shown in greater in FIGS. 8 to 11, respectively. As noted in the figure, the sequence of the collection cycle remains the same as in the Doligez and Gonthier algorithm. The Clear stage shown in FIG. 7 acts to initialize the collection cycle. The Mark and Scan stages shown in FIG. 7 together constitute the mark phase of a mark-sweep collector and the Sweep stage shown in FIG. 7 constitutes the sweep phase thereof.

At the start of the collection cycle the values of whiteColor and blackColor are exchanged. All objects subject to collection are then whiteColor and all objects on the free list are blue. The color of a reachable object progresses from whiteColor to Gray to blackColor during the Mark and Scan stages of the collector. At the end of the Scan stage (FIG. 10), reachable objects are generally blackColor although, owing to the race condition in Doligez and Gonthier, some may be Gray. This however does not derogate from the correctness of the algorithm. The Sweep stage (FIG. 11) frees the whiteColor objects and changes them to Blue.

Figure 8:
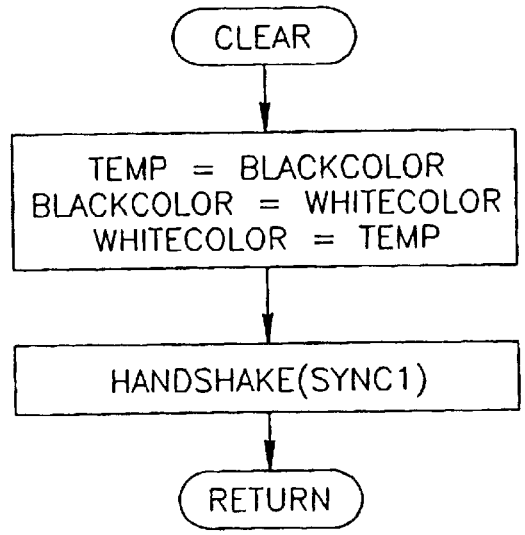

FIG. 8 shows the Clear stage which initializes the collection cycle. The values of whiteColor and blackColor are exchanged and then the collector executes handshake in order to move the mutator threads into Sync1. In this handshake the collector changes its status variable from Async to Sync1 and then waits until each of the mutator threads has changed its status variable to Sync1. The exchange of whiteColor and blackColor constitutes the distinction over the Doligez and Gonthier algorithm. The pseudocode is as follows:

```
clearo {
  // exchange whiteColor and blackColor
* int temp=whiteColor;
* whiteColor=blackColor;
* blackColor=temp;
  handshake(SYNC1)
}
```

FIG. 9 shows the Mark stage, which sets a variable, swept, which maps each object in the heap, to an initial value that is smaller than the corresponding value for the first object in the heap. This signals to the write barrier that the Mark stage has commenced. The write barrier remains the same as shown by Doligez and Gonthier and is therefore not repeated here. The Mark stage continues along two parallel threads. The first thread performs a handshake to bring the mutator threads to Sync2. It then sets the global variable allocationColor to blackColor. This step distinguishes the first thread from the Doligez and Gonthier algorithm. Finally, the first thread then performs a second handshake to bring the mutator threads to Async. The second thread iterates through the global variables and traces the objects reached therefrom. The Trace procedure employed in FIG. 9 is the same as in Doligez and Gonthier, except that blackColor and whiteColor play the roles of Black and White, respectively. The Mark stage terminates when both the first and second threads are complete. The pseudocode is as follows:

```
mark () {
  swept=-infinity
  cobegin
    handshake(SYNC2);
*   allocationColor=blackColor;
    handshake(ASYNC);
  and
    foreach x in Globals do
      Trace(x);
}
```

Figure 10:
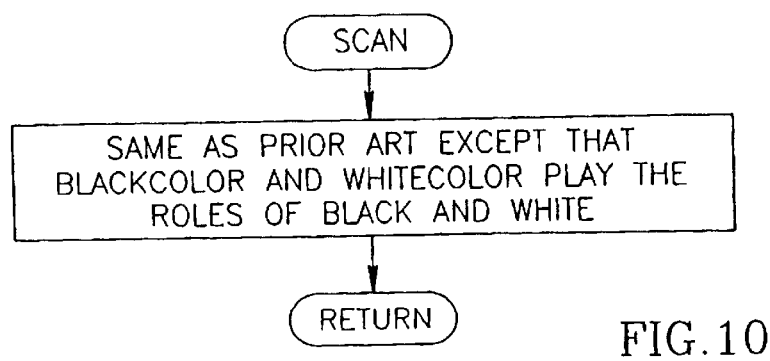

FIG. 10 shows the Scan stage which completes the tracing of the reachable objects. It is identical to the Scan stage in the Doligez and Gonthier algorithm, except that blackColor and whiteColor play the roles of Black and White, respectively.

Figure 11:
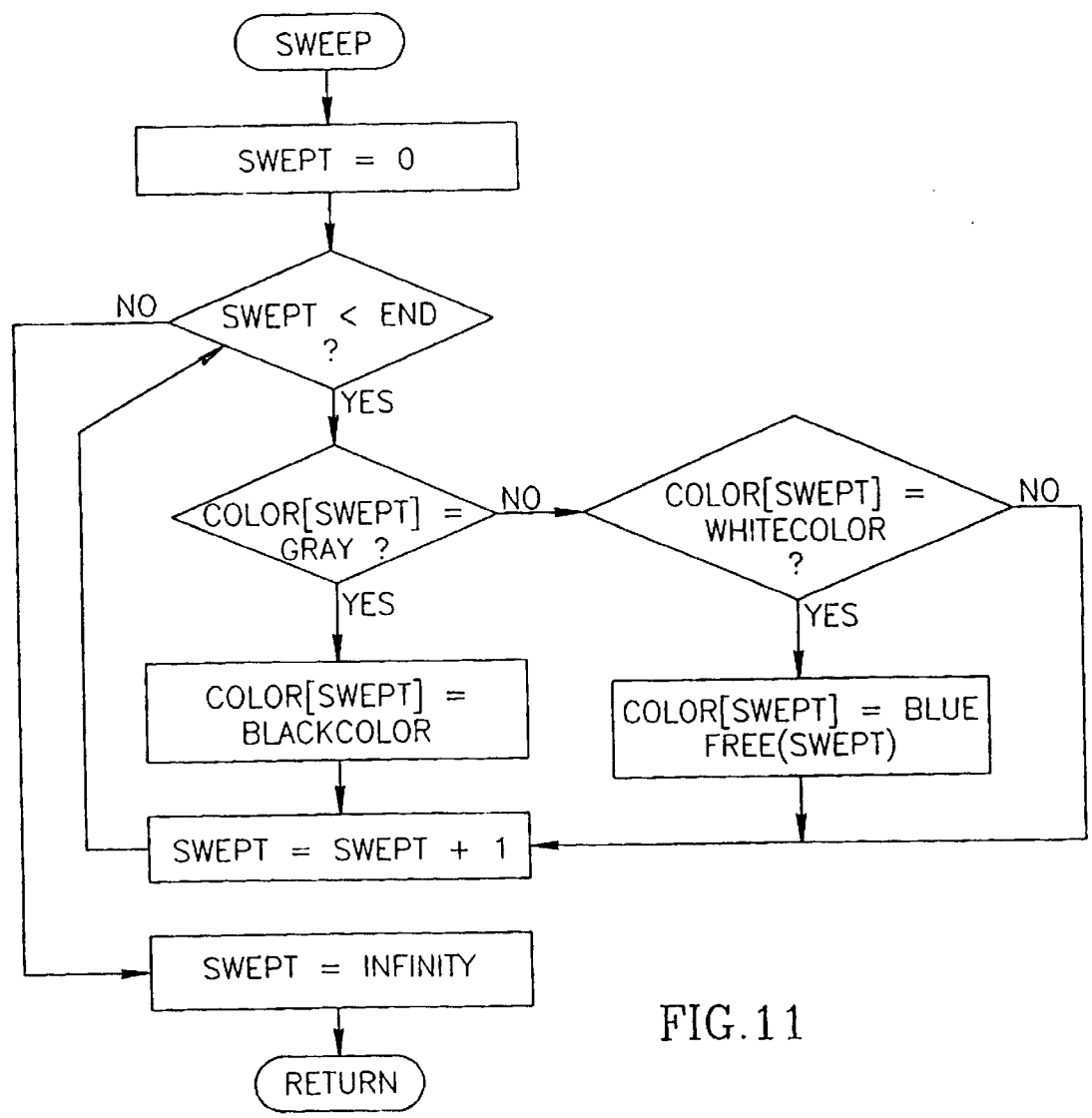

FIG. 11 shows the Sweep stage which initializes the variable, swept to zero, this denoting the first object in the heap. For each object in the heap, its color is examined. If equal to Gray, then its color is reset to blackColor. Otherwise, if its color is equal to whiteColor, then it is reset to Blue and the object is freed. If its color is neither Gray nor whiteColor, no action is taken. The variable swept is then incremented so as to cause the color of the next object in the heap to be examined. At the end of the procedure, the value of swept is set to infinity, a value which is guaranteed to be larger than the corresponding value for the last object in the heap. The pseudocode for Sweep is as follows:

```
sweep()
  swept=0;
  while (swept<end_of_heap) do
*   if (color[swept]==Gray)
*     color[swept]=blackColor;
*   else if (color[swept]==whiteColor)
      color[swept]=Blue;
      append_to_free_list(swept);
    swept=swept+1;
  swept=+infinity;
```

The principal difference between the above-described sweep stage and that of Doligez and Gonthier is that, in the invention, objects colored blackColor do not need to have their color reset to whiteColor. These objects automatically become whiteColor at the start of the next collection cycle when the roles of whiteColor and blackColor are exchanged.

There are three other functions defined by Doligez and Gonthier which require amendment, i.e. MarkGray, MarkAndWarn and MarkBlack. In each case, all occurrences of White are replaced by whiteColor and Black by blackColor, these being the only required changes.

Alternative Embodiment

In the embodiments so far described, a different local mutator thread variable was used in respect of each different mutator thread for assigning the color to new objects allocated by that thread. As an alternative, a single global variable may be employed in respect of the mutator threads. This simplifies the code since the occurrence of allocColor[m] in the create protocol is simply replaced by allocationColor and all code involving allocColor[m] is removed.

The line allocationColor=blackColor found in the Mark phase can actually occur any time after Handshake(Sync1) and before Handshake(Async). It seems logical to place it as late as possible (exactly where it is placed above) to minimize the amount of unreclaimable garbage.

Implementation with a global variable has the disadvantage of creating more floating garbage, and the advantage of being slightly simpler. The amount of additional floating garbage caused by employing a single global allocation color is a function of the number of objects which a thread can create without noticing a change in the collector's status.

It is thus seen that the invention gives a simple and efficient method for implementing the color switch idea for the Doligez and Gonthier collector and for collectors sufficiently similar thereto.

Specifically, the principles of the invention are equally suited to other concurrent garbage collectors running on shared memory using an algorithm characterized in that:
  a status variable is changed during the collection cycle, and
  actions taken by the program threads when updating and allocating an object may depend on that status.

Likewise, the algorithm may be characterized in that:
  no coordination with the garbage collector is required when a reference to an object in the heap is added or updated to, or removed from, a mutator's stack.

The algorithm may be further characterized in that:
  the collector thread has a status variable which only it can modify but which can be read by all the program threads, and
  each program thread has a respective status variable which can be read by the collector thread.

The garbage collector may have multiple collector threads.

Further, whilst the invention has been described with particular regard to separate collector and program threads, it should be noted that the invention is also applicable to the case that one or more program threads intermittently takes on the role of garbage collection.

It will also be understood that the use of colors in the marking phase of a mark sweep garbage collector is arbitrary. The invention has been explained with regard to colors because this is the conventional terminology. However, any suitable attribute may be employed to denote whether an object is marked, whether its descendants too are marked and whether a memory location is free.

The hardware as described makes particular reference to implementing the garbage collector within a complete computer system. However, it will be appreciated that it can also be implemented in a read/write memory component which is sold separate from the computer to which it is eventually coupled.

Likewise, whilst in the preferred embodiment a clear distinction has been made between the hardware and software functions of the garbage collector, in practice the functions carried out by software in the preferred embodiment may be at least partially implemented in hardware as part of the memory component.

In the method claims which follow, alphabetic characters used to designate claim steps are provided for convenience only and do not imply any particular order of performing the steps.

What is claimed is:

1. A computer implemented method for eliminating synchronization between a garbage collector thread performing a sweep and a mutator thread allocating a new object, wherein there are at least two mutator threads, in a concurrent garbage collector for a heap implemented in shared memory having mark and sweep phases, without requiring more than one thread to stop simultaneously, the method comprising the steps of:
 (a) in a first collection cycle, associating a first attribute with objects believed to be reachable and associating a second attribute with objects believed to be unreachable,
 (b) in a successive collection cycle, associating said first attribute with objects believed to be unreachable and associating said second attribute with objects believed to be reachable, and
 (c) repeating steps (a) and (b) for all successive cycles.

2. The method according to claim 1, wherein the first and second attributes are colors.

3. The method according to claim 2, wherein the first and second colors are assigned using respective variables whose values are exchanged during alternate collection cycles.

4. The method according to claim 3, wherein said values are exchanged towards the beginning or the end of each collection cycle.

5. The method according to claim 1, further including the steps of:
 (d) employing a separate allocation value to mark newly allocated objects for each mutator thread, and
 (e) changing the allocation value at an appropriate point in the collection cycle.

6. The method according to claim 5, wherein the appropriate point in the collection cycle is during the mark phase of the collection cycle.

7. The method according to claim 5, wherein said appropriate point in the collection cycle is chosen so that each mutator thread starts marking newly allocated objects as late as possible in the collection cycle thereby eliminating some floating garbage.

8. The method according to claim 7, wherein the allocation value is a color.

9. The method according to claim 1, wherein the garbage collector is an on-the-fly garbage collector.

10. The method according to claim 1, wherein the garbage collector uses an algorithm characterized in that:
 a status variable is changed during the collection cycle, and actions taken by the mutator threads when updating and allocating an object may depend on that status.

11. The method according to claim 1, wherein the algorithm is characterized in that:
 no coordination with the garbage collector is required when a reference to an object in the heap is added or updated to, or removed from, a mutator's stack.

12. The method according to claim 10, wherein the algorithm is characterized in that:
 no coordination with the garbage collector is required when a reference to an object in the heap is added or updated to, or removed from, a mutator's stack.

13. The method according to claim 11, wherein the algorithm is further characterized in that:
 the collector thread has a status variable which only it can modify but which can be read by all the mutator threads, and
 each program thread has a respective status variable which can be read by the collector thread.

14. The method according to claim 1, wherein the garbage collector has multiple collector threads.

15. The method according to claim 5, wherein each mutator thread assigns to a new object an attribute whose value is stored in a respective allocation variable.

16. The method according to claim 5, wherein each mutator thread assigns to a new object an attribute whose value is stored in a global allocation variable.

17. The method according to claim 1, wherein one or more mutator threads intermittently takes on a rôle of garbage collection.

18. A program product, comprising:
 a program configured to perform a method for eliminating synchronization between a garbage collector thread performing a sweep and a mutator thread allocating a new object, wherein there are at least two mutator threads, in a concurrent garbage collector for a heap implemented in shared memory having mark and sweep phases, without requiring more than one thread to stop simultaneously, the method comprising:
 (a) in a first collection cycle, associating a first attribute with objects believed to be reachable and associating a second attribute with objects believed to be unreachable,
 (b) in a successive collection cycle, associating said first attribute with objects believed to be unreachable and associating said second attribute with objects believed to be reachable, and
 (c) repeating steps (a) and (b) for all successive cycles.

19. A computer implemented program storage device readable by machine, tangibly embodying a program of instructions executable by the machine to perform method steps for eliminating synchronization between a garbage collector thread performing a sweep and a mutator thread allocating a new object, wherein there are at least two mutator threads, in a concurrent garbage collector for a heap implemented in shared memory having mark and sweep phases, without requiring more than one thread to stop simultaneously, the method comprising the steps of:
 (a) in a first collection cycle, associating a first attribute with objects believed to be reachable and associating a second attribute with objects believed to be unreachable,
 (b) in a successive collection cycle, associating said first attribute with objects believed to be unreachable and associating said second attribute with objects believed to be reachable, and
 (c) repeating steps (a) and (b) for all successive cycles.

20. A computer implemented computer program product comprising a computer useable medium having computer readable program code embodied therein for eliminating synchronization between a garbage collector thread performing a sweep and a mutator thread allocating a new object, wherein there are at least two mutator threads, in a concurrent garbage collector for a heap implemented in shared memory having mark and sweep phases, without requiring more than one thread to stop simultaneously, the computer program product comprising:
 computer readable program code for causing the computer to associate a first attribute with objects believed to be reachable and to associate a second attribute with objects believed to be unreachable in a first collection cycle, computer readable program code for causing the computer to associate said first attribute with objects believed to be unreachable and to associate said second attribute with objects believed to be reachable in a successive collection cycle.

21. The method according to claim 1, wherein:
 the at least two mutator threads read from and write to a shared memory,
 the shared memory is not sequentially consistent, and
 the mark sweep collector operates to avoid implicit synchronization which would otherwise be required.

* * * * *